(12) United States Patent
Eutsler et al.

(10) Patent No.: US 9,155,282 B2
(45) Date of Patent: Oct. 13, 2015

(54) METHOD OF CONTROLLING AMMONIA EMISSIONS FROM ANIMAL AGRICULTURE OPERATIONS

(71) Applicant: Jones-Hamilton Co., Walbrige, OH (US)

(72) Inventors: Eric P. Eutsler, Salisbury, MD (US); Carl J. Knueven, Bowling Green, OH (US)

(73) Assignee: Jones-Hamilton Co., Walbridge, OH (US)

( * ) Notice: Subject to any disclaimer, the term of this patent is extended or adjusted under 35 U.S.C. 154(b) by 0 days.

(21) Appl. No.: 14/171,988

(22) Filed: Feb. 4, 2014

(65) Prior Publication Data

US 2014/0144384 A1      May 29, 2014

Related U.S. Application Data

(62) Division of application No. 12/946,472, filed on Nov. 15, 2010, now Pat. No. 8,662,019.

(60) Provisional application No. 61/385,224, filed on Sep. 22, 2010.

(51) Int. Cl.
  *A01K 1/01* (2006.01)
  *A01K 1/00* (2006.01)

(52) U.S. Cl.
  CPC ................ *A01K 1/01* (2013.01); *A01K 1/0082* (2013.01)

(58) Field of Classification Search
  CPC .................................................... A01K 1/0047
  USPC ............... 119/57.91, 436, 437, 442, 444, 447
  See application file for complete search history.

(56) References Cited

U.S. PATENT DOCUMENTS

| | | | |
|---|---|---|---|
| 1,327,428 A * | 1/1920 | Gregory | 4/567 |
| 3,884,191 A * | 5/1975 | Stout | 119/671 |
| 3,966,450 A | 6/1976 | O'Neill et al. | |
| 4,987,861 A * | 1/1991 | Lemire et al. | 119/667 |
| 5,017,203 A | 5/1991 | Cox et al. | |
| 5,028,009 A * | 7/1991 | Takata | 239/655 |
| 5,135,743 A * | 8/1992 | Stanislowski et al. | 424/76.6 |
| 5,333,572 A * | 8/1994 | Nutt | 119/57.91 |
| 5,630,379 A * | 5/1997 | Gerk et al. | 119/667 |
| 5,666,905 A | 9/1997 | Mackin et al. | |
| 5,707,658 A * | 1/1998 | Morgan et al. | 424/600 |
| 5,773,063 A | 6/1998 | Knueven | |
| 5,865,143 A * | 2/1999 | Moore, Jr. | 119/442 |
| 5,890,454 A * | 4/1999 | Moore, Jr. | 119/447 |
| 5,958,491 A | 9/1999 | Knueven | |
| 5,961,968 A | 10/1999 | Moore, Jr. | |
| 6,346,240 B1 | 2/2002 | Moore, Jr. | |

(Continued)

*Primary Examiner* — Justin Benedik
(74) *Attorney, Agent, or Firm* — MacMillan, Sobanski & Todd, LLC (57) ABSTRACT

An apparatus is disclosed for applying a chemical, such as an ammonia control chemical, in an animal house. The apparatus includes spreading apparatus adapted to be installed at an elevated position in the animal house and adapted for spreading the chemical onto the floor in the house. The apparatus also includes feeding apparatus adapted for feeding the chemical from a supply to the spreading apparatus. A method of controlling ammonia emissions from an animal agriculture operation includes applying an ammonia control chemical during both the early part and the late part of the grow out of the animals so that the chemical contacts ammonia from animal waste and reduces or prevents its emission into the air.

16 Claims, 4 Drawing Sheets

(56) References Cited

U.S. PATENT DOCUMENTS

| | | |
|---|---|---|
| 6,358,729 B1 | 3/2002 | Ferranti |
| 6,463,617 B1 * | 10/2002 | Decker ............................ 15/53.3 |
| 6,520,118 B2 * | 2/2003 | Swiegers et al. .............. 119/666 |
| 6,742,478 B1 * | 6/2004 | Davis ............................. 119/526 |
| 7,194,979 B2 | 3/2007 | Moore, Jr. |
| 2004/0050338 A1 * | 3/2004 | Ford ............................... 119/437 |
| 2011/0202186 A1 * | 8/2011 | Weeden ......................... 700/283 |

* cited by examiner

METHOD OF CONTROLLING AMMONIA EMISSIONS FROM ANIMAL AGRICULTURE OPERATIONS

CROSS-REFERENCE TO RELATED APPLICATION

This application is a divisional of pending U.S. application Ser. No. 12/946,472, filed Nov. 15, 2010, which claims the benefit of U.S. Provisional Application No. 61/385,224, filed Sep. 22, 2010, the disclosures of which are incorporated herein by reference.

BACKGROUND OF THE INVENTION

This invention relates in general to animal agriculture operations and in particular to the control of ammonia emissions from these operations.

In animal agriculture operations, ammonia gas is generated as animal wastes break down. The ammonia gas can be harmful to the health and growth rate of animals, and ammonia emissions to the atmosphere are an environmental concern. To address these problems, different methods have been used to control ammonia emissions from animal agriculture operations.

One method of controlling ammonia emissions is to apply a chemical to the animal waste. For example, in the production of broiler chickens it is known to apply a chemical such as sodium bisulfate, aluminum sulfate, iron sulfate or sulfuric acid to the litter on the floor of a chicken house. When ammonia from the chicken waste comes into contact with the chemical it reacts and is changed into solid ammonium sulfate and as a result it is not emitted into the air as gaseous ammonia.

In a typical broiler chicken operation, the chemical is applied on the floor of the chicken house before the chickens are introduced into the house. This application will normally control ammonia emissions for the first two weeks of growth of the chickens. The period of growth of the chickens, from the time of their birth to the time at which they are large enough to be collected for meat, is called the "grow out" and it is about six weeks for broiler chickens. The chickens cover the entire floor of the chicken house, and as they grow they become bigger and more packed together. After the chickens are in the house, there is currently no practical means of applying a chemical to the floor to control ammonia. Consequently, after the first two weeks of the grow out, ammonia emissions from the chicken waste resume and continue throughout the remainder of the grow out.

Therefore, it would be desirable to provide an apparatus and a method for controlling ammonia emissions from animal agriculture operations during both the early part and the late part of the grow out of the animals.

SUMMARY OF THE INVENTION

This invention relates to an apparatus for applying a chemical, such as an ammonia control chemical, in an animal house. The apparatus includes spreading apparatus adapted to be installed at an elevated position in the animal house and adapted for spreading the chemical onto the floor in the house. The apparatus also includes feeding apparatus adapted for feeding the chemical from a supply to the spreading apparatus.

An improved animal house for use in an animal agriculture operation is structured for housing and raising multiple animals and includes the above-described apparatus for applying a chemical in the house.

A method of controlling ammonia emissions from an animal agriculture operation includes applying an ammonia control chemical during both the early part and the late part of the grow out of the animals so that the chemical contacts ammonia from animal waste and reduces or prevents its emission into the air.

Various aspects of this invention will become apparent to those skilled in the art from the following detailed description of the preferred embodiment, when read in light of the accompanying drawings.

DETAILED DESCRIPTION OF THE PREFERRED EMBODIMENT

This present invention relates to an apparatus for applying a chemical in an animal house. The chemical may be an ammonia control chemical, or it may be a chemical applied in the animal house for any other purpose, such as controlling microorganisms, improving the health and/or growth of the animals, or others.

Ammonia control chemicals are known and include materials such as sodium bisulfate, potassium bisulfate, aluminum sulfate, iron sulfate, sulfuric acid, other inorganic acids or salts of inorganic acids, and other materials that are capable of controlling ammonia emissions by any means. In certain embodiments, the chemical is an inorganic acid or a salt of an inorganic acid, and in more particular embodiments it is a solid inorganic acid or salt thereof.

In certain embodiments, the ammonia control chemical is an alkali metal salt of an inorganic acid, or a mixture of different salts. Some examples of alkali metals include sodium, potassium and lithium, and some examples of inorganic acids include sulfate, phosphate and nitrate. In some particular embodiments, the metal salts are alkali metal bisulfates which include, for example, sodium bisulfate (i.e., sodium acid sulfate or sodium hydrogen sulfate), potassium bisulfate (i.e., potassium acid sulfate or potassium hydrogen sulfate), or mixtures thereof.

An example of a sodium bisulfate that can be used is a feed grade sodium bisulfate manufactured by Jones-Hamilton Co., 30354 Tracy Road, Walbridge, Ohio 43465. It is approved by the FDA as a feed ingredient and is listed as a "General Purpose Feed Additive" with no restrictions in the Official Publication of the Association of American Feed Control Officials. This sodium bisulfate is described in more detail in U.S. Pat. Nos. 5,707,658; 5,773,063; 5,958,491; 6,132,792; 6,620,445; 7,048,803; and 7,097,861 which are incorporated by reference herein. The Jones-Hamilton sodium bisulfate is in dry granular crystalline form in particle sizes that can be readily and uniformly dispersed and solubilized in aqueous media. In certain embodiments, the particles having a generally spherical shape with an average diameter from about 0.03 mm to about 1 mm, typically about 0.75 mm. Also, in certain embodiments, the product includes sodium bisulfate in an amount from about 91.5% to about 97.5% by weight (typically about 93%), and sodium sulfate in an amount from about 2.5% to about 8.5% by weight (typically about 7%). However, other shapes and compositions of sodium bisulfate could also be used.

The animal house can be any type which is structured for housing and raising multiple animals in an animal agriculture operation. Some examples of animals that can be raised in such operations include poultry, swine, cows, sheep and horses. The poultry can include chickens, turkeys, ducks and geese. The chickens can be chickens farmed for meat (called "broilers") or egg-laying hens.

Various structures of different types of animal houses are known, and they can vary depending on the animal, the type of agriculture operation, the country and different regions of a country. In certain embodiments, the animal house is a chicken house for broilers or hens. Houses for broilers often are either wood frame structures (having a wood frame, enclosed side walls and a roof) or pole structures (having poles for a frame, open sides and a roof). They often are generally rectangular enclosures, and the interior may be continuous and extend the entire length and width of the house, or it may be divided into separate parts/chambers of the house. The ammonia control apparatus and method of the invention can be used in an entire house or in any part of a house.

A broiler house usually includes a floor which consists of hard flooring covered by a layer of litter. The hard flooring may be, for example, packed dirt/earth (a "pad") or concrete. The litter may be, for example, wood shavings, sawdust, rice hulls or peanut shells. A broiler house includes equipment for feeding and watering the broilers, and it often includes climate control and ventilation equipment. A house for egg-laying hens often includes multiple cages for the hens, which may be stacked in rows inside the house.

Figure 1:
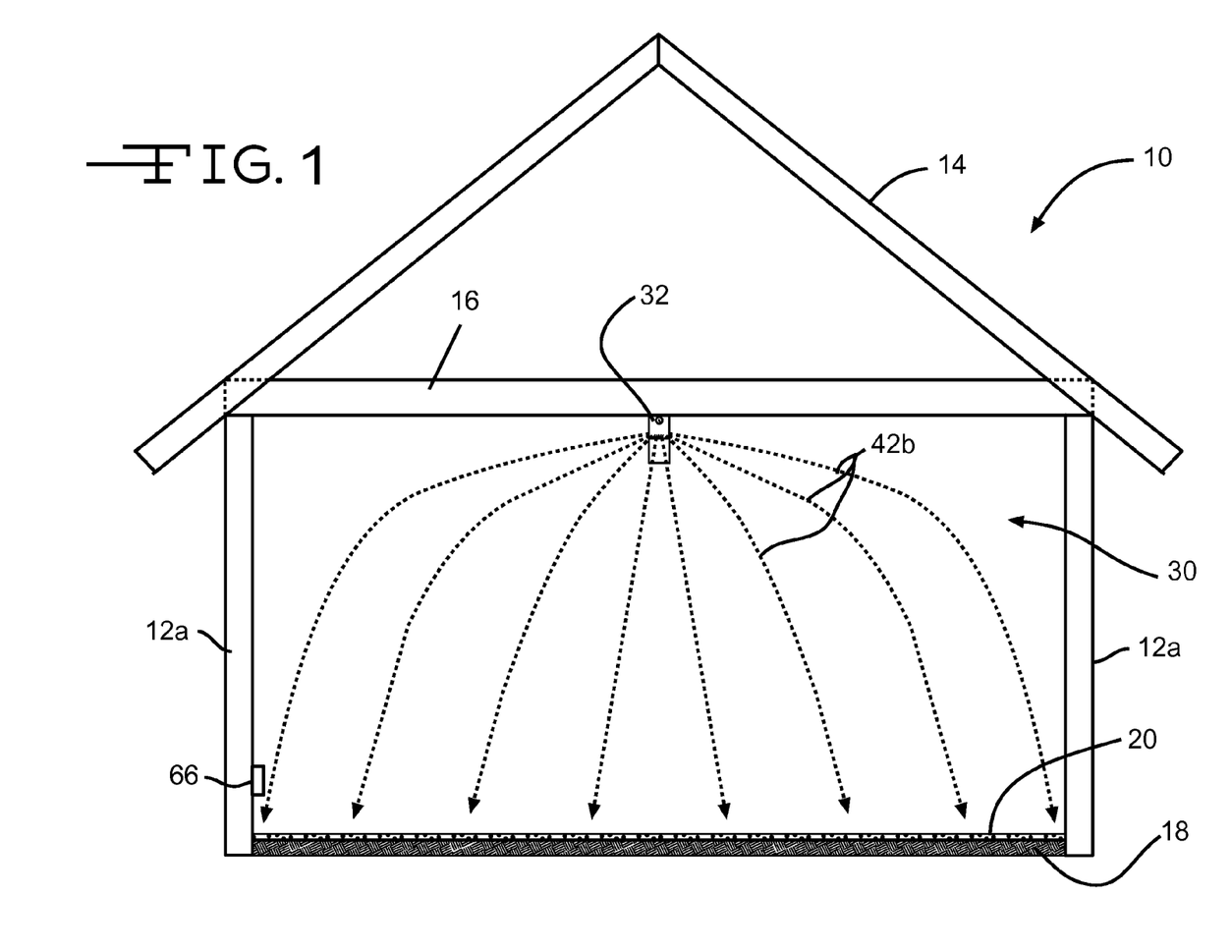
FIG. 1 is a cross-sectional view of a chicken house having apparatus installed in the house for applying a chemical such as an ammonia control chemical.
Figure 2:
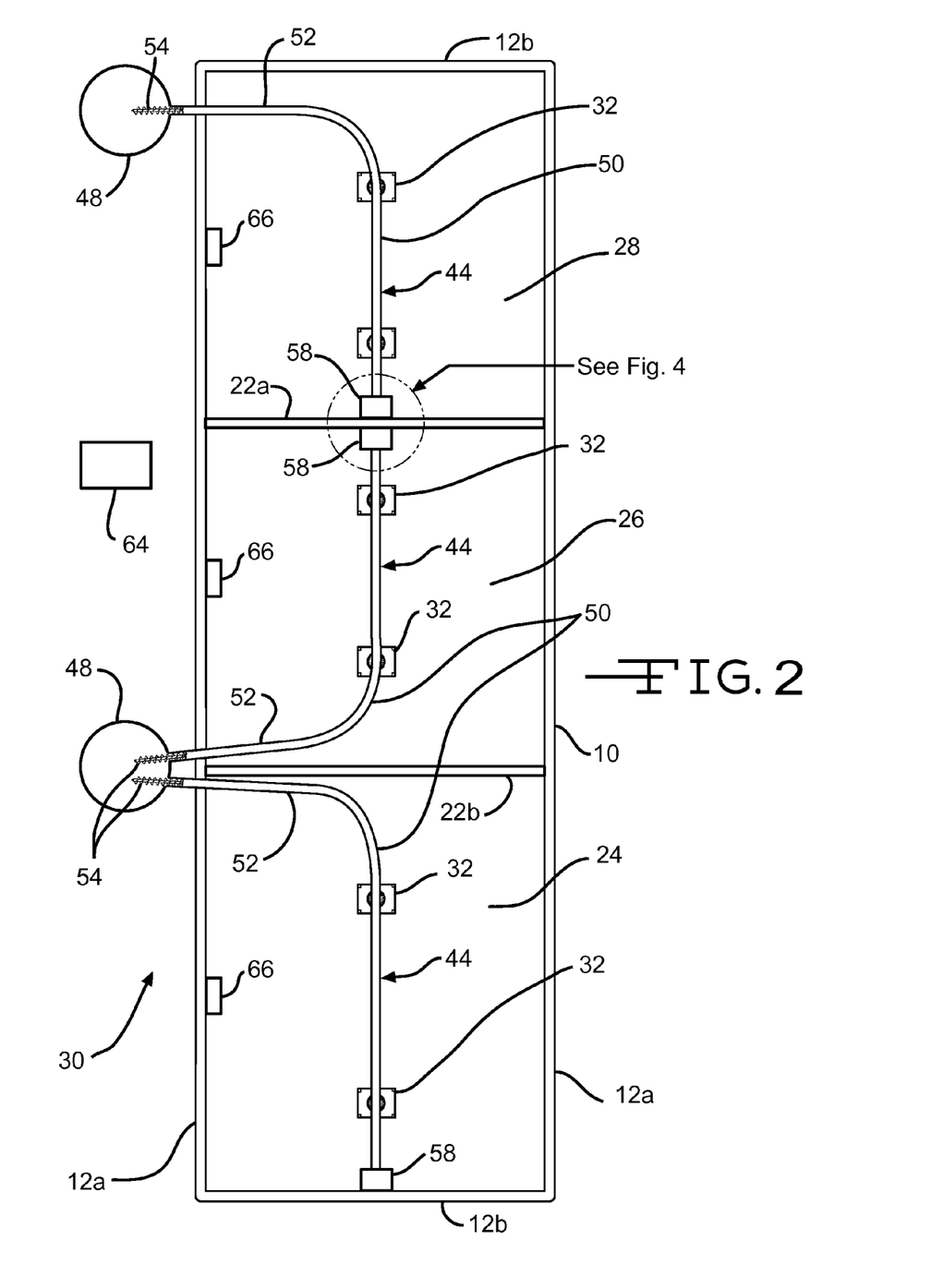
FIG. 2 is a plan view of the chicken house showing in more detail the apparatus for applying a chemical.

Referring now to the drawings, there is illustrated in FIGS. 1 and 2 an example of a chicken house 10 that may be used for housing and raising broiler chickens. The illustrated chicken house 10 is a generally rectangular structure, including exterior walls 12a and 12b and a roof 14. The doors are not shown. The chicken house 10 can have any suitable dimensions. For example, a commercial chicken house may be about 400 to 600 feet long and about 30 to 70 feet wide. The illustrated chicken house 10 also includes a ceiling 16. The height of the ceiling 16 can vary; for example, it may be about 10 to 14 feet high. In some chicken houses the roof 14 is the ceiling and there is no separate ceiling 16. The chicken house 10 also includes a floor which consists of an earth pad 18 covered by a layer of litter 20 such as wood chips.

The illustrated chicken house 10 is divided by interior walls 22a and 22b into separate chambers: a brooding area or brood chamber 24 for newly hatched chicks, a second chamber 26 and a third chamber 28. The size of the chambers can vary. For example, in a 500 foot long chicken house, the brood chamber 24 may be about 200 feet long, the second chamber 26 about 150 feet long and the third chamber 28 about 150 feet long.

The chicken house 10 has installed therein an apparatus 30 for applying a chemical according to the invention. The application apparatus 30 includes spreading apparatus 32 adapted to be installed at an elevated position in the chicken house 10 and adapted for spreading the chemical onto the floor (onto the litter 20) in the house. The spreading apparatus 32 is able to spread the chemical in the chicken house even when it is filled with chickens, thereby overcoming the current problem of applying a chemical with chickens in the house. This allows the application of a chemical, such as an ammonia control chemical, during both the early part and the late part of the grow out of the chickens.

The spreading apparatus 32 can include any type of apparatus adapted to be installed at an elevated position in the animal house and adapted for spreading the chemical onto the floor in the house. The installation at an elevated position allows the chemical to be dropped from above the chickens or other animals onto the floor. This allows the chemical to be applied on the floor without substantial interference from the animals in the house. The elevated position can be any suitable height above the floor. It is usually positioned above the animals. In certain embodiments, the spreading apparatus is positioned at heights above the floor of at least about 5 feet, at least about 6 feet, at least about 7 feet, or at least about 8 feet, and in certain embodiments within a range from about 8 feet to about 15 feet above the floor. This distance is the height from the floor to the part of the apparatus that does the spreading.

The spreading apparatus 32 can be positioned at the elevated position in any suitable manner. For example, the apparatus can be suspended from the ceiling, installed on or in the ceiling, mounted on poles or other platforms extending upward from the floor, or mounted on wall(s).

The spreading apparatus 32 can spread the chemical onto the floor in the house using any suitable spreading device/structure/mechanism. As will be described below, the spreading apparatus 32 shown in the drawings includes a spinning platen or spinner for spreading the chemical. However, an example of another apparatus that could be used includes apparatus that pneumatically blows the chemical on the floor in the house. A pneumatic apparatus could also be used for feeding the chemical. Any other suitable devices/apparatus for feeding and/or spreading chemicals or similar materials could be used.

The spreading apparatus 32 can achieve any suitable result in spreading the chemical onto the floor in the animal house. In certain embodiments, the apparatus 32 can spread the chemical to cover substantially the entire floor of the house or one or more chambers. For example, the apparatus 32 may be able to spread the chemical a distance of at least about 20 feet, at least about 25 feet or at least about 30 feet. The apparatus 32 can spread the chemical in any suitable shaped area on the floor, for example, a generally circular or rectangular area. In a particular example, a spreading apparatus 32 may be able to spread the chemical in a generally circular area a distance of 30 feet (a 30 foot radius), providing coverage of the chemical on the floor in a 60 foot diameter circle. In certain embodiments, the spreading apparatus 32 includes multiple spreading devices at spaced locations or stations in the house in order to allow coverage of substantially the entire floor.

Referring again to the chicken house 10 in FIGS. 1 and 2, the illustrated spreading apparatus 32 is suspended from the ceiling 16 of the chicken house. As shown in FIG. 2, the application apparatus 30 includes multiple stations of the spreading apparatus 32 at spaced locations in the different chambers 24, 26 and 28 of the house 10 in order to cover substantially the entire floor of the house with the chemical. In certain embodiments, each spreading apparatus 32 is adapted for spreading the chemical over an area of at least about 1,000 square feet on the floor, more particularly at least 1,500 square feet, more particularly at least about 2,000 square feet, and most particularly at least about 2,500 square feet.

Figure 3:
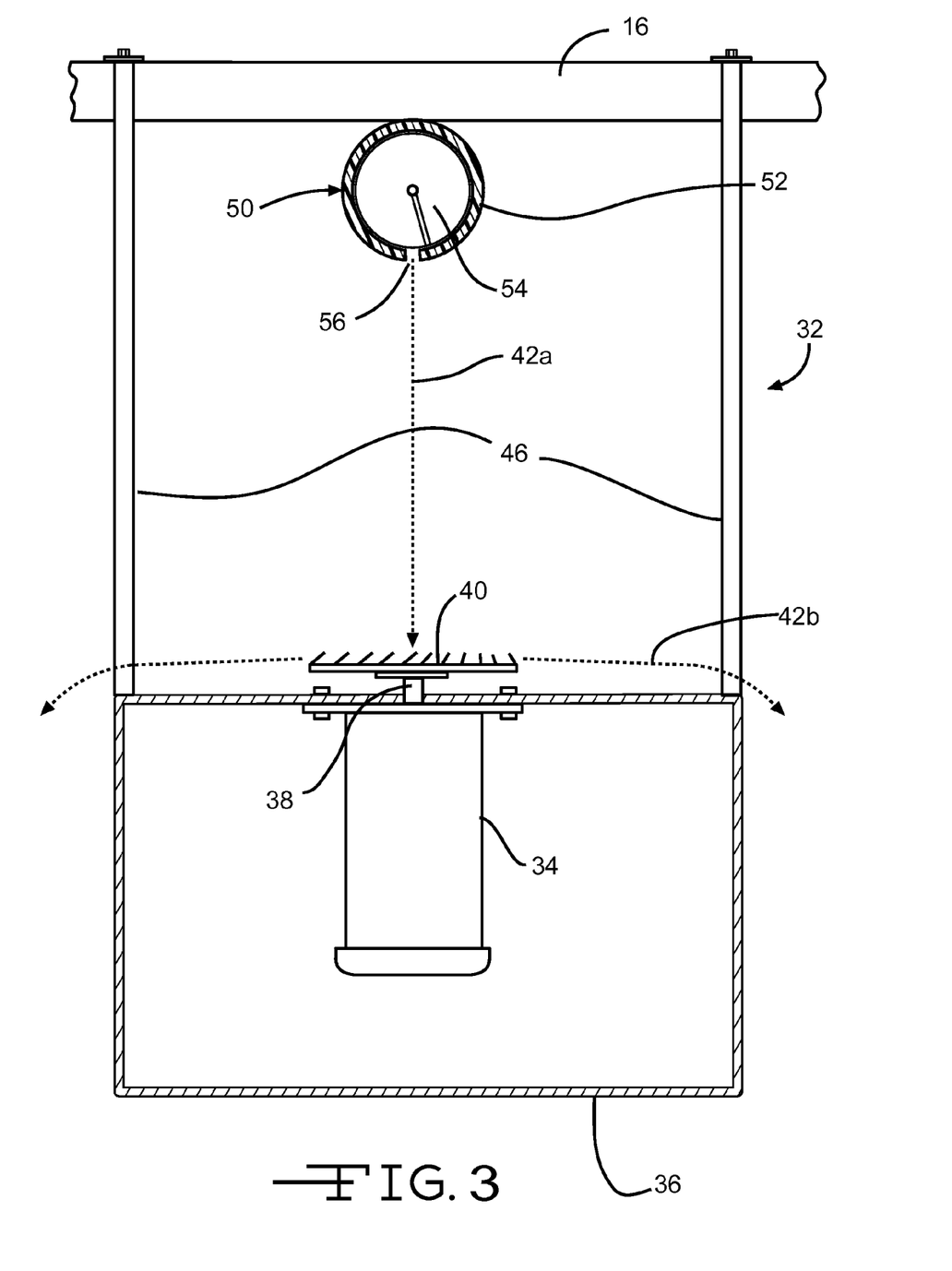
FIG. 3 is a cross-sectional view of a spreading apparatus which is part of the apparatus for applying a chemical.

FIG. 3 shows a particular example of a spreading apparatus 32 that may be used in the invention. The spreading apparatus 32 includes a motor 34 installed inside a motor housing 36. The motor 34 may be of the type referred to as a "deer feeder motor", which is a device used to spread corn kernels when feeding deer. The motor 34 can have any suitable size and power output; for example, it may be a 6 volt or 12 volt DC motor. The motor 34 includes a rotating output shaft 38 with a flanged end. A generally circular platen or spinner 40 is attached to the end of the output shaft 38. The spinner 40 can be any suitable size, for example a diameter of about 4 inches. Operation of the motor 34 causes the spinner 40 to rotate at a speed sufficient to spread the chemical.

When the apparatus 30 for applying a chemical is in operation, a stream 42a of the chemical drops down from a feed line 50 (described below) onto the top of the rotating spinner 40. When the chemical contacts the top of the rotating spinner, the chemical is spread 42b all around in a generally circular area and it drops to the floor (shown in FIG. 1).

In certain embodiments, the spreading apparatus 32 includes a height adjustment mechanism for raising or lowering the apparatus relative to the floor. This may be useful to adjust for different ceiling heights in different animal houses. Any suitable height adjustment mechanism can be used. In the embodiment shown in FIG. 3, the spreading apparatus 32 includes a pair of adjustable brackets 46 installed between the motor housing 36 and the ceiling 16 for raising or lowering the apparatus.

As shown in FIG. 2, the apparatus 30 for applying a chemical according to the invention also includes a feeding apparatus 44 adapted for feeding the chemical from a supply 48 to the spreading apparatus 32. The supply 48 of chemical can be any type of container, pipeline or other source of the chemical. In the illustrated embodiment, the supply consists of two storage bins 48 located outside the chicken house 10. Alternatively, a single bin or more than two bins could be used, and they could be located inside the house instead of outside. Any suitable type of storage bin 48 can be used. In certain embodiments, each storage bin can contain at least about 2,000 pounds of chemical. In a particular example, the storage bins are feed bins such as those manufactured by Poly Bins Inc., Warsaw, N.C., having a storage capacity of 2.8 tons.

In certain embodiments, the feeding apparatus 44 is adapted for conveying the chemical through substantially the entire length of the chicken house 10, so that multiple spreading apparatuses 32 at spaced locations in the house can be fed with the chemical. This can be accomplished using any suitable type of feeding apparatus. Some examples of feeding apparatuses that may be used include plastic disc shaped auger feeding systems, chain link feeding systems, and others.

Figure 4:
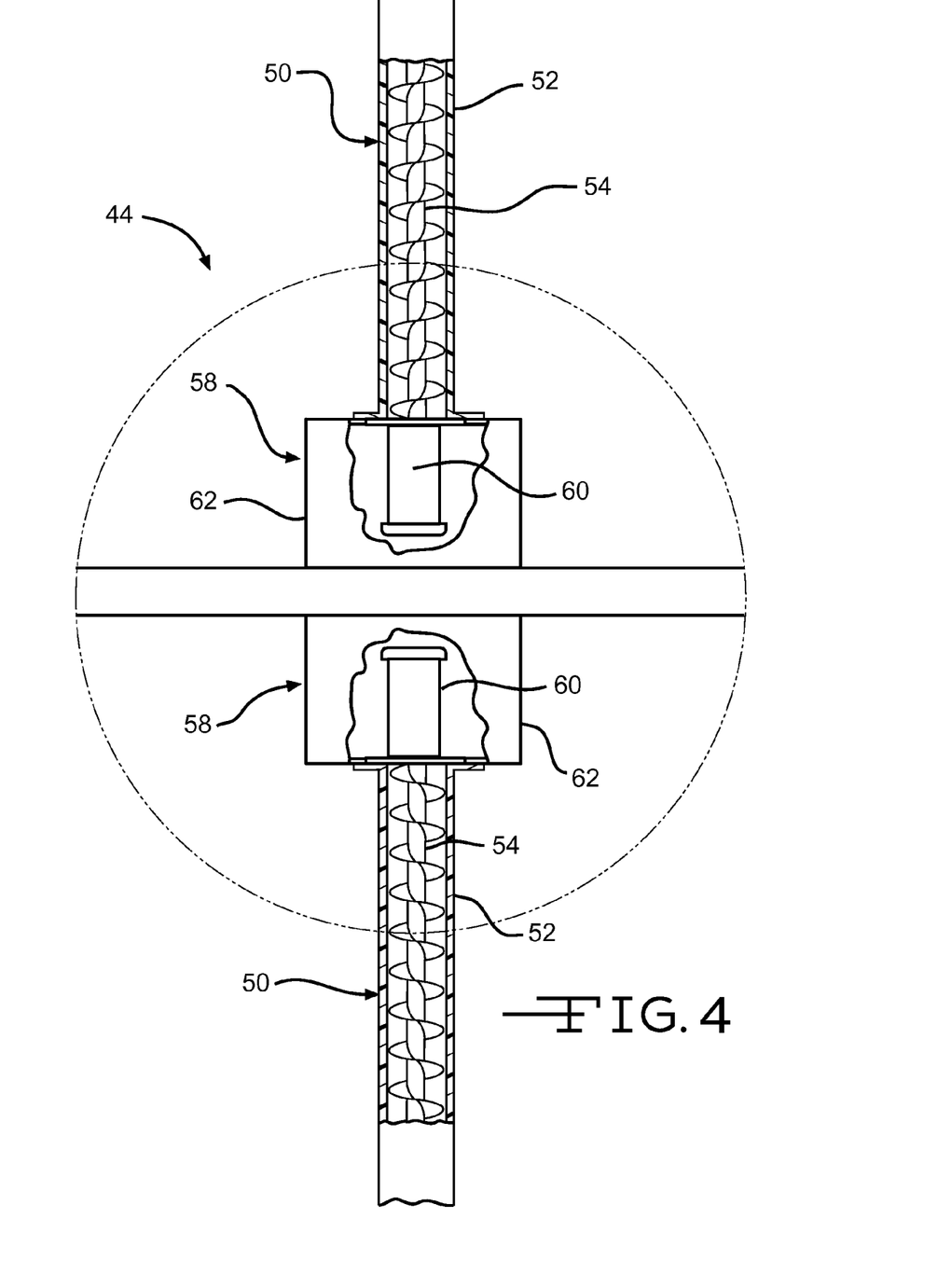
FIG. 4 is a plan view, partially cut away and partially in cross-section, of the ends of two feeding apparatuses which are part of the apparatus for applying a chemical.

In the embodiment shown in FIGS. 2 and 4, the feeding apparatus 44 includes three feed lines 50 extending from the storage bins 48 to the three chambers inside the chicken house 10. The feed lines 50 are attached to or installed in the ceiling and extend through the center of the house.

The feed lines 50 can have any suitable structure. In the illustrated embodiment, the feed lines 50 consist of continuous lengths of tubing 52 (shown in FIG. 4) for conveying the chemical. Any suitable type of tubing 52 can be used, such as plastic or metallic tubing. In a particular embodiment, the tubing 52 is PVC pipe having any suitable diameter, such as a 3 inch diameter.

In the illustrated embodiment, the feed lines 50 also include an auger 54 inside the tubing 52. The rotation of the auger 54 inside the tubing 52 causes the chemical to move along the length of the tubing from the storage bin to the spreading apparatus. As shown in FIG. 1, the ends of the augers 54 extend inside the storage bins 48 to auger the chemical out of the bins into the tubing 52. Any suitable type of auger 54 can be used. In a particular embodiment, the auger 54 is a flexible auger such as a flexible steel auger. For example, a Flex-Auger® Conveying System sold by Brock Grain Systems, Milford, Ind., includes a flexible steel auger inside a PVC pipe.

As shown in FIG. 3, the feed line 50 is attached to the ceiling 16. The feed line 50 includes the auger 54 inside the tubing 52. The feed line 50 extends through the spreading apparatus 32. At the location of the spreading apparatus 32, a hole 56 is formed in the bottom of the tubing 52. The hole 56 allows the stream 42a of chemical to drop from the tubing 52 onto the spinner 40 for spreading the chemical in the chicken house as described above.

As shown in FIGS. 2 and 4, the feeding apparatus 44 also includes three drive assemblies 58 to operate each of the three feed lines 50. The drive assemblies 58 are installed on the ceiling in the chicken house at the ends of the feed lines opposite the storage bins. As shown in FIG. 4, each of the drive assemblies 58 includes a drive motor 60 inside a housing 62. The drive motor 60 is attached to the end of the auger 54 to drive rotation of the auger. Any suitable type of motor can be used as the drive motor 60. For example, the drive motor 60 may be a ½ horsepower DC variable speed drive motor with reduction gear and discharge head unloader and boot.

The feeding apparatus 44 and the spreading apparatus 32 can be synchronized to run at the same time. This can be accomplished using any suitable devices or systems. For example, both the motors 34 of the spreading apparatus 32 and the drive motors 60 of the feeding apparatus 44 can be wired to a central controller using any suitable equipment. This can also be done wirelessly using any suitable wireless communications equipment. FIG. 2 shows a representation of a controller 64 that could be used. Any suitable type of controller could be used for synchronizing the feeding apparatus 44 and the spreading apparatus 32. An example of a controller that may be used is a Chore-Tronics® controller manufactured by Chore-Time, Milford, Ind. 46542.

In certain embodiments, the apparatus 30 for applying a chemical also includes an automatic control mechanism for turning the apparatus on and off under predetermined conditions. For example, the apparatus may be automatically turned on and off in response to a detected gas level in the animal house. When the apparatus is used for controlling ammonia emissions, the apparatus may be automatically turned on when the ammonia level goes above 25 ppm and turned off when the ammonia level is 25 ppm or below, in order to comply with EPA and OSHA standards. For example, when the ammonia level goes above 25 ppm the apparatus can be turned on, and the ammonia control chemical can be spread in the house and react with the ammonia to lower the level of emissions to a desired level, for example to a level of about 20 ppm or below, more particularly about 10 ppm or below, and more particularly about 5 ppm or below.

When the apparatus 30 is automatically turned on and off in response to a detected gas level in the animal house, the apparatus can include one or more gas detectors for detecting the level of gas in the animal house. For example, a number of commercial ammonia detectors are known. The gas detector(s) can be installed in the animal house at any suitable location(s). In the case of a chicken house, they may be installed on the wall of the house at a height between about 1-2 feet from the floor, which is above the heads of the chickens but relatively close to the animal waste producing the ammonia. FIG. 2 shows three ammonia detectors 66 installed on the wall 12a in the three chambers of the chicken house 10.

The automatic control mechanism for turning the apparatus 30 on and off may also include a controller for sending a signal to turn the apparatus on and off in response to the detected gas level. FIG. 2 shows a controller 64 for the apparatus. The communication between the gas detectors and the computer, and between the computer and the apparatus, can be accomplished by any suitable means, such as by wired or wireless electronic communication. Any suitable controller may be used, such as a Chore-Tronics® controller.

The present invention also relates to a method of controlling ammonia emissions from an animal agriculture operation. The method involves applying an ammonia control chemical during both the early part and the late part of the grow out of the animals so that the chemical contacts ammonia from animal waste and reduces or prevents its emission into the air. As discussed above in the background section, currently there is no practical method of applying an ammonia control chemical after the first two weeks of the grow out of chickens, resulting in problems with ammonia emissions during the remainder of the grow out.

The period of the "grow out" can differ depending on the type of animal and the particular agriculture operation. For broiler chickens the grow out is defined herein as 6 weeks. For turkeys, the grow out period is from 9 to 21 weeks depending on the size of the bird. The grow out periods for other animals are known in the agriculture industry.

The ammonia control chemical is applied at times during both the early part and the late part of the grow out of the animals. By "early part" as used herein is meant the first half of the grow out period, and by "late part" is meant the second half of the grow out period. For example, in the case of broiler chickens, the ammonia control chemical is applied at one or more times during the first three weeks of the six week grow out period, and it is also applied at one or more times during the last three weeks of the grow out.

The method is not limited to the use of any particular application apparatus. However, in certain embodiments the application apparatus 30 described above is used during the late part of the grow out or after the first two weeks of the grow out (while using another application method in the first two weeks), and in other embodiments the application apparatus 30 is used at times during both the early part and the late part of the grow out.

The ammonia control chemical is applied during any number of days suitable for controlling ammonia to a desired level. In certain embodiments, the chemical is applied during at least about 20% of the days of the grow out period, more particularly at least about 40%, more particularly at least about 60%, more particularly at least about 80%, and most particularly at least about 90% of the days of the grow out period. In certain embodiments, the chemical may be applied about every day of the grow out period.

The ammonia control chemical can be applied once per day, twice per day, less than once per day, or more often than once per day, depending on the particular agriculture operation, in order to control ammonia emissions in the animal house to a desired level. In certain embodiments, the method includes detecting the level of ammonia in the air during the animal agriculture operation and applying the ammonia control chemical at times and in amounts sufficient to keep the ammonia level below a predetermined level, for example at a level below 25 ppm. In certain embodiments, the level of ammonia emissions is kept at a level below 25 ppm during the entire grow out of the animal.

The amount of ammonia control chemical applied in an animal house may vary depending on the particular animal, the particular operation and other conditions. For example, the amount of sodium bisulfate used in a chicken agriculture operation may be within a range of from about 80 to about 1000 pounds per application day, and more particularly from about 80 to about 500 pounds per application day.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A method of controlling ammonia emissions from an animal agriculture operation which is the production of chickens in a chicken house, the method comprising:
 applying dry granules of an ammonia control chemical comprising alkali metal bisulfate have an average diameter from 0.3 mm to 1 mm during both the early part and the late part of the grow out of the chickens so that the chemical contacts ammonia from chicken waste and reduces or prevents its emission into the air;
 wherein the ammonia control chemical is applied by feeding the granules from a granule supply to an elevated position above the chickens, and at the elevated position spreading the granules so that they drop onto litter on a floor of the chicken house and are spread over an area of the floor.

2. The method of claim 1 wherein the ammonia control chemical is applied from above cages in the chicken house holding the chickens, through the cages, down onto the floor.

3. The method of claim 1 wherein applying the ammonia control chemical includes spreading it over an area of at least 1,000 square feet.

4. The method of claim 1 wherein applying the ammonia control chemical includes spreading it from a spreader apparatus a distance of at least 20 feet.

5. The method of claim 1 wherein the ammonia control chemical is applied during at least 60% of the days of the grow out period.

6. The method of claim 1 wherein the alkali metal bisulfate is applied in an amount within a range of from 80 to 1000 pounds per application day.

7. A method of controlling ammonia emissions from an animal agriculture operation which is the production of chickens in a chicken house, the method comprising:
 applying dry granules of an ammonia control chemical comprising metal bisulfate during both the early part and the late part of the grow out of the chickens so that the chemical contacts ammonia from chicken waste and reduces or prevents its emission into the air;
 wherein the ammonia control chemical is applied by feeding the granules from a granule supply to an elevated position above the chickens, and at the elevated position spreading the granules so that they drop onto litter on a floor of the chicken house and are spread over an area of the floor.

8. The method of claim 7 wherein the ammonia control chemical is applied to keep the ammonia level below 25 ppm.

9. The method of claim 7 wherein applying the ammonia control chemical includes spreading it over an area of at least 1,000 square feet.

10. The method of claim 7 wherein applying the ammonia control chemical includes spreading it from a spreader apparatus a distance of at least 20 feet.

11. The method of claim 7 wherein the ammonia control chemical is applied during at least 60% of the days of the grow out period.

12. A method of controlling ammonia emissions from an animal agriculture operation which is the production of poultry in a poultry house, the method comprising:

applying dry granules of an ammonia control chemical comprising alkali metal bisulfate have an average diameter from 0.3 mm to 1 mm during both the early part and the late part of the grow out of the poultry so that the chemical contacts ammonia from poultry waste and reduces or prevents its emission into the air;

wherein the ammonia control chemical is applied by feeding the granules from a granule supply to an elevated position above the poultry, and at the elevated position spreading the granules so that they drop onto a floor of the poultry house and are spread over an area of the floor.

13. The method of claim 12 wherein the ammonia control chemical is applied onto litter on the floor.

14. The method of claim 12 wherein the ammonia control chemical is applied to keep the ammonia level below 25 ppm.

15. The method of claim 12 wherein the ammonia control chemical is applied during at least 60% of the days of the grow out period.

16. The method of claim 12 wherein the ammonia control chemical is applied in an amount within a range of from 80 to 1000 pounds per application day.

\* \* \* \* \*